US008508514B2

(12) United States Patent
Sah

(10) Patent No.: US 8,508,514 B2
(45) Date of Patent: Aug. 13, 2013

(54) DISPLAY MODULE AND DRIVING METHOD THEREOF

(75) Inventor: Wen-Jyh Sah, Tainan (TW)

(73) Assignee: Pervasive Display Co., Ltd., Tainan (TW)

( * ) Notice: Subject to any disclaimer, the term of this patent is extended or adjusted under 35 U.S.C. 154(b) by 943 days.

(21) Appl. No.: 12/506,546

(22) Filed: Jul. 21, 2009

(65) Prior Publication Data

US 2010/0020053 A1 Jan. 28, 2010

(30) Foreign Application Priority Data

Jul. 22, 2008 (TW) ................................ 97127819 A

(51) Int. Cl.
*G09G 5/00* (2006.01)
*G06F 3/038* (2006.01)

(52) U.S. Cl.
USPC ............... 345/204; 345/92; 345/94; 345/100; 345/104; 345/208; 252/299.01

(58) Field of Classification Search
USPC ....... 345/87–104, 208, 38, 50, 204; 349/142; 252/299.01
See application file for complete search history.

(56) References Cited

U.S. PATENT DOCUMENTS 5,414,443 A * 5/1995 Kanatani et al. ................ 345/95
6,366,116 B1 4/2002 Juang
2004/0150607 A1* 8/2004 Nakajima et al. ............. 345/100
2004/0239586 A1 12/2004 Cok
2005/0001797 A1 1/2005 Miller, IV et al.
2006/0279514 A1* 12/2006 Yokota et al. ................. 345/100

FOREIGN PATENT DOCUMENTS

| | | | |
|---|---|---|---|
| CN | 1614675 | A | 4/2004 |
| CN | 101046935 | A | 10/2007 |
| EP | 1 708 168 | A2 | 10/2006 |
| JP | 58-043494 | A | 3/1983 |
| JP | 07-175445 | A | 7/1995 |
| JP | 08-179731 | A | 7/1996 |
| JP | 2003-295785 | A | 10/2003 |
| TW | 453135 | B | 1/2001 |

* cited by examiner

*Primary Examiner* — Lun-Yi Lao
*Assistant Examiner* — Insa Sadio
(74) *Attorney, Agent, or Firm* — Birch, Stewart, Kolasch & Birch, LLP

(57) ABSTRACT

A display module includes a scan line, a data line, a driving circuit and a level converting circuit. The driving circuit has at least one first driving unit and at least one second driving unit electrically connected to the first driving unit. A non-DC signal is transmitted between the first driving unit and the second driving unit for controlling the first driving unit and/or the second driving unit. The first driving unit outputs a first driving signal to the scan line. The second driving unit outputs a second driving signal to the level converting circuit. The level converting circuit is electrically connected with the driving circuit and the data line, and outputs a display signal to the data line according to the second driving signal. A driving method of the display module is also disclosed.

23 Claims, 13 Drawing Sheets

DISPLAY MODULE AND DRIVING METHOD THEREOF

CROSS REFERENCE TO RELATED APPLICATIONS

This Non-provisional application claims priority under 35 U.S.C. §119(a) on Patent Application No(s). 097127819 filed in Taiwan, Republic of China on Jul. 22, 2008, the entire contents of which are hereby incorporated by reference.

BACKGROUND OF THE INVENTION

1. Field of Invention

The present invention relates to a display module and a driving method thereof.

2. Related Art

The display devices have been developed from the conventional cathode ray tube (CRT) display device to the current liquid crystal display (LCD) device, organic light emitting diode (OLED) display device, and E-paper display device. The sizes and weights of the current display devices are greatly reduced and the current display devices are widely used in communication, information, and consumer electronic products.

FIG. 1 is a conventional display device 1 that is an LCD device for example. With reference to FIG. 1, the conventional display device 1 includes an LCD module that has an LCD panel 11, a data driving circuit 12, and a scan driving circuit 13. The data driving circuit 12 is electrically connected to the LCD panel 11 via a plurality of data lines $D_{11}$~$D_{1n}$. The scan driving circuit 13 is electrically connected to the LCD panel 11 via a plurality of scanning lines $S_{11}$~$S_{1m}$.

FIG. 2 is a schematic view of the conventional data driving circuit 12. With reference to FIG. 2, the data driving circuit 12 includes a shift register unit 122, a first stage latch unit 123, a second stage latch unit 124, and a level shift unit 125. The shift register unit 122 is electrically connected to the first stage latch unit 123. The second stage latch unit 124 is electrically connected to the first stage latch unit 123 and the level shift unit 125.

FIG. 3 is a timing control diagram of the data driving circuit 12. With reference to FIG. 3, the shift register unit 122 generates the shift register signals $S_{R1}$~$S_{RN}$ according to a start pulse signal $S_{01}$ and a clock signal CK, and transmits the shift register signals $S_{R1}$~$S_{RN}$ to the first stage latch unit 123.

The first stage latch unit 123 receives an image signal $S_{02}$ according to the shift register signals $S_{R1}$~$S_{RN}$. The image signal $S_{02}$ includes a plurality of image data and is stored in the first stage latch unit 123. The second stage latch unit 124 captures the image signal $S_{02}$ to the second stage latch unit 124 according to a latch enabling signal $S_{03}$. The level shift unit 125 converts the image signal $S_{02}$ stored in the second stage latch unit 124 into a plurality of display signals, and the display signals are transmitted to the LCD panel 11 via the corresponding data lines $D_{11}$~$D_{1m}$ so as to show a display image.

However, the current display device tends to be lighter, thinner compacter. If the data driving circuit 12 and scan driving circuit 13 in the display module can be integrated to decrease the number of elements under the current structure of display device, the display device may provide more space or be even lighter so as to further lower down the production cost. Therefore, it is an important subject to provide a display module and a driving method thereof for decreasing the number of the driving elements.

SUMMARY OF THE INVENTION

In view of the foregoing, the present invention is to provide a display module and a driving method thereof with fewer number of driving elements.

To achieve the above, the present invention discloses a display module including a scan line, a data line, a driving circuit, and a level converting circuit, which has at least one first driving unit and at least one second driving unit that is electrically connected to the first driving unit. A non-DC signal is transmitted between the first driving unit and the second driving unit for controlling the first driving unit and/or the second driving unit. The first driving unit outputs a first driving signal to the scan line and the second driving unit outputs a second driving signal to the level converting circuit. The level converting circuit is electrically connected to the driving circuit and the data line, and outputs a display signal to the data line according to the second driving signal.

To achieve the above, the present invention discloses a driving method of a display module having a scan line, a data line, a driving circuit, a level converting circuit. The driving circuit includes at least one first driving unit and at least one second driving unit. The driving method of the display module includes the steps of transmitting a non-DC signal between the first driving unit and the second driving unit; outputting a first driving signal to the scan line from the first driving unit; outputting a second driving signal from the second driving unit, wherein the non-DC signal controls the first driving unit and the second driving unit; and outputting a display signal to the data line from the level converting circuit according to the second driving signal.

To achieve the above, the present invention discloses a display module including a scan line, a data line, a driving circuit, and a level converting circuit. The driving circuit includes at least one first driving unit and at least one second driving unit connected to the first driving unit. A non-DC signal is transmitted between the first driving unit and the second driving unit for controlling the first driving unit and/or the second driving unit. The first driving unit outputs a first driving signal to the level converting circuit and the second driving unit outputs a second driving signal to the data line. The level converting circuit is electrically connected to the driving circuit and the scan line, and outputs a scanning signal to the scan line according to the first driving signal.

To achieve the above, the present invention discloses a driving method of a display module having a scan line, a data line, a driving circuit, and a level converting circuit. The driving circuit includes at least one first driving unit and at least one second driving unit. The driving method includes the steps of transmitting a non-DC signal between the first driving unit and the second driving unit; outputting a first driving signal from the first driving unit; outputting a second driving signal to the data line from the second driving unit, wherein the non-DC signal controls the first driving unit and the second driving unit; and outputting a scanning signal to the scan line from the level converting circuit according to the first driving signal.

To achieve the above, the present invention discloses a display module including a scan line, a data line, a driving circuit, and a level converting circuit. The driving circuit has at least one first driving unit and at least one second driving unit electrically connected to the first driving unit. A non-DC signal is transmitted between the first driving unit and the second driving unit for controlling the first driving unit and/or the second driving unit. The first driving unit outputs a first driving signal and the second driving unit outputs a second driving signal. The level converting circuit includes a level converting unit and a bypass unit connected to the level converting circuit in parallel. The level converting circuit is electrically connected to the driving circuit and the scan line is electrically connected to the data line. The level converting unit or the bypass unit is selected for the first driving signal to pass through according to a selecting signal for outputting a scanning signal to the scan line or outputting the display signal to the data line. Alternatively, the level converting unit or the bypass unit is selected for the second driving signal to pass through according to the selecting signal for outputting the scanning signal to the scan line or outputting the display signal to the data line.

To achieve the above, the present invention discloses a driving method of the display module, which includes a scan line, a data line, a driving circuit, and a level converting circuit. The driving circuit has at least one first driving unit and at least one second driving unit. The level converting circuit has a level converting unit and a bypass unit connected to each other in parallel. The driving method includes the steps of transmitting a non-DC signal between the first driving unit and the second driving unit; outputting a first driving signal from the first driving unit; outputting a second driving signal from the second driving unit, wherein the non-DC signal controls the first driving unit and the second driving unit; selecting the level converting unit or the bypass unit for the first driving signal to pass through according to a selecting signal for outputting a scanning signal from the level converting circuit to the scan line or outputting the display signal from the level converting circuit to the data line; and selecting the level converting unit or the bypass unit for the second driving signal to pass through according to the selecting signal for outputting the scamning signal from the level converting circuit to the scan line or outputting the display signal from the level converting circuit to the data line.

As mentioned above, the display module and the driving method thereof of the present invention disclose that the display module with the driving circuit and the level converting circuit may be used to process the scanning signal and display signal for generating display images. Compared to the prior art, the display device of the present invention not only integrates the traditional scan driving circuit and data driving circuit, it may further be a simpler structure that can process the scanning signal and the display signal simultaneously. Therefore, the display module and the driving method thereof of the present invention may have a decreased number of driving elements for saving space so as to reduce the production cost.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

The display module of the present invention may be a non-volatile display module, which is a display module having at least two steady states that can last at least several tens of milliseconds after the power is removed. The optical modulation material in the display module may include an electrophoretic liquid, an electric moisture material, a cholesterol liquid crystal, or a nematic liquid crystal.

First Embodiment

Figure 1:
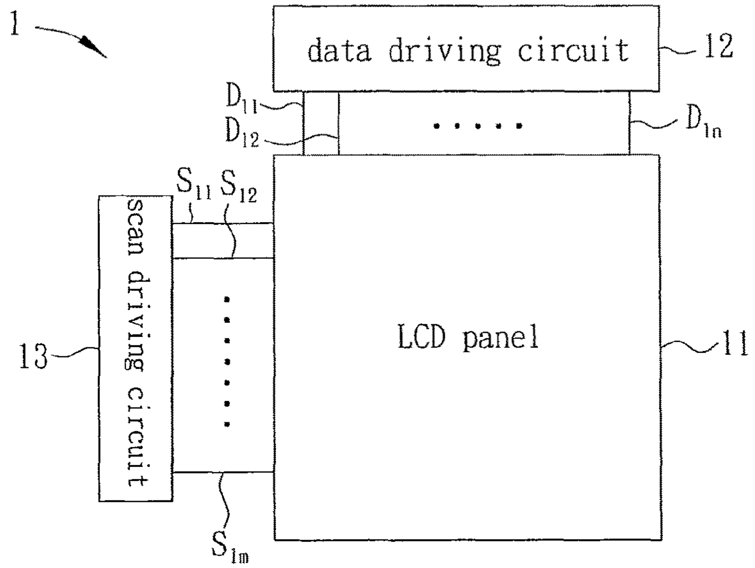
FIG. 1 (Prior Art)
FIG. 1 is a schematic view of a conventional display device.
Figure 2:
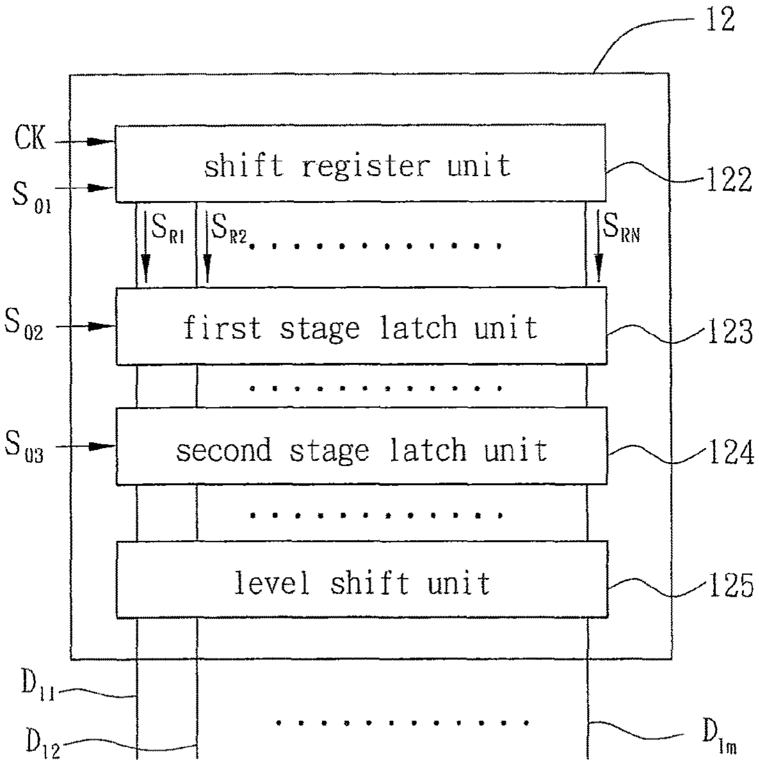
FIG. 2 (Prior Art)
FIG. 2 is a schematic view of a conventional data driving circuit.
Figure 3:
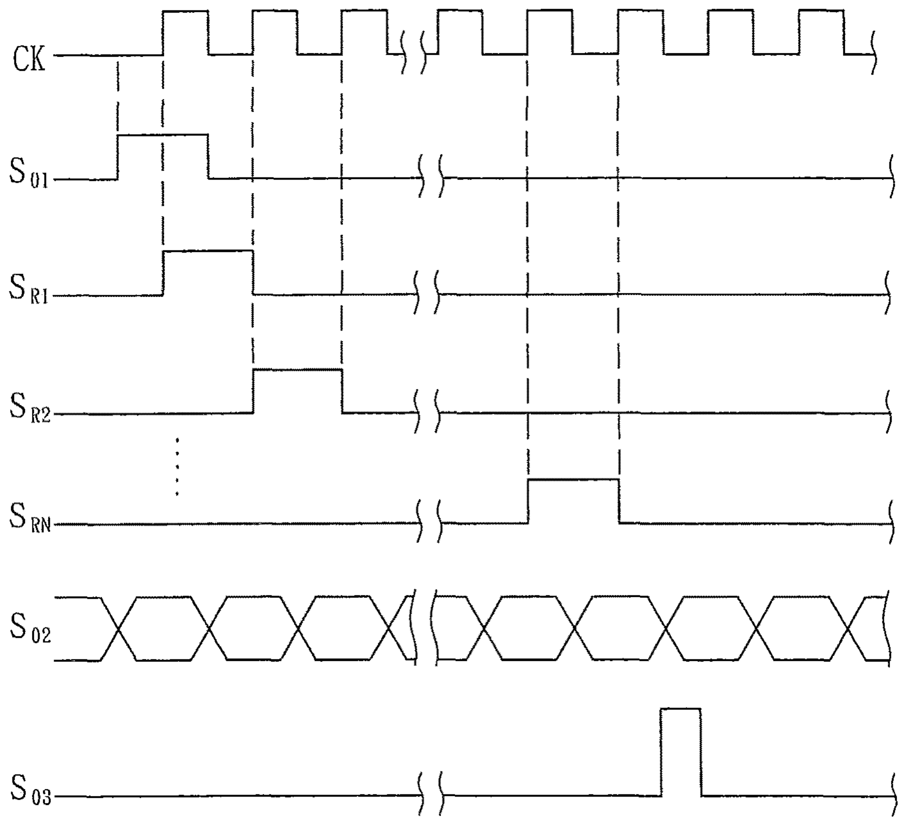
FIG. 3 (Prior Art)
FIG. 3 is a timing control diagram of the data driving circuit of the conventional display device.
Figure 4:
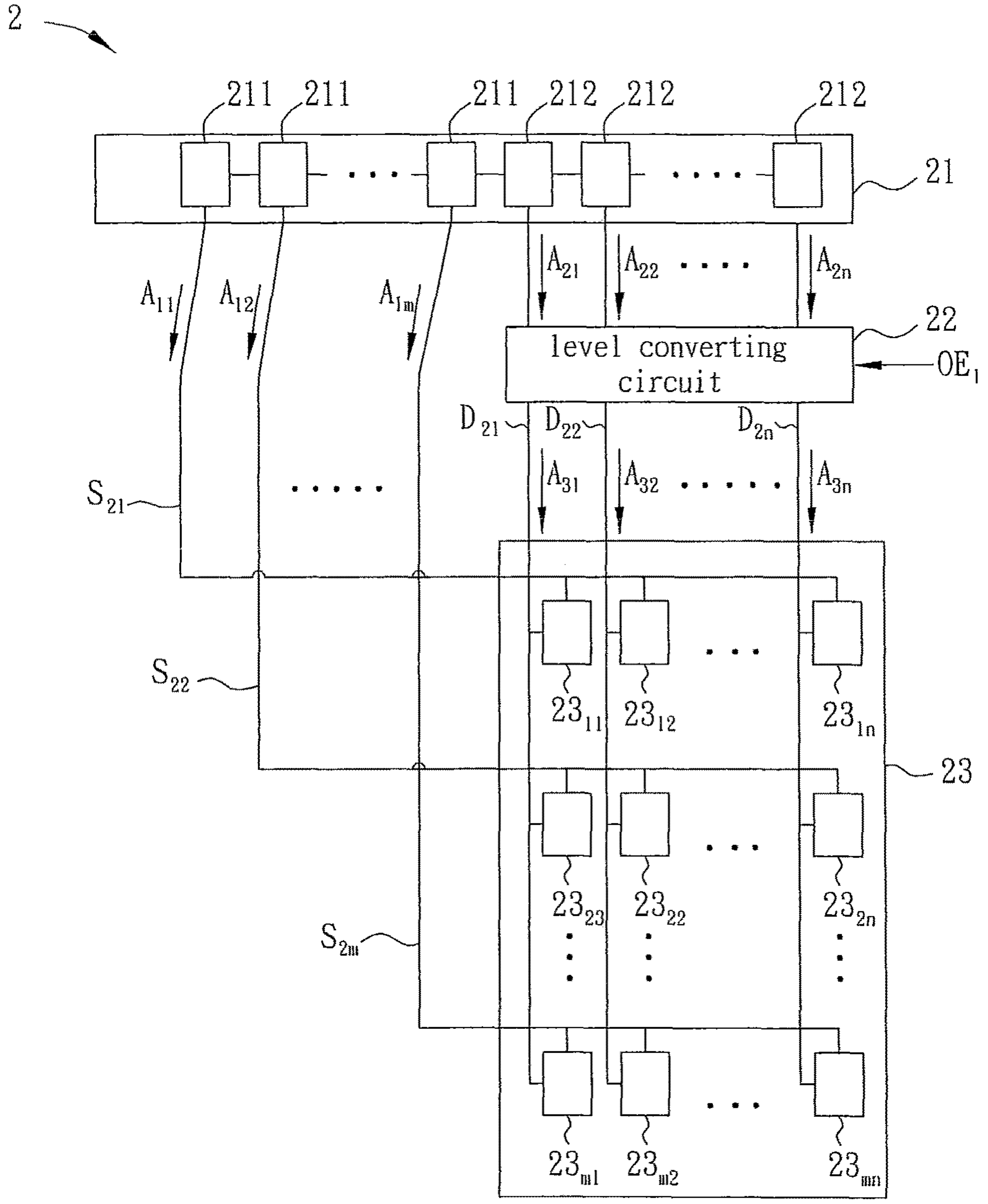
FIG. 4 is a schematic view of a display device according to a first embodiment of the present invention.

FIG. 4 is a schematic view of a display module 2. With reference to FIG. 4, the display module 2 includes a scan line, a data line, a driving circuit 21, and a level converting circuit 22. In the embodiment, the display module 2 includes a plurality of scan lines $S_{21}$~$S_{2m}$ and a plurality of data lines $D_{21}$~$D_{2n}$ for example. The driving circuit 21 is electrically connected to the scan lines $S_{21}$~$S_{2m}$ and the level converting circuit 22 that is electrically connected to the data lines $D_{21}$~$D_{2n}$, where m and n are positive integers greater than 1.

The driving circuit 21 includes at least one first driving unit and at least one second driving unit. In the embodiment, the driving circuit 21 has a plurality of first driving units 211 and a plurality of second driving units 212 for example. The first driving unit 211 is electrically connected to the second driving unit 212. Each of the first driving units 211 and second driving units 212 may have, for example but not limited to, the same or different circuit structures.

When the display module 2 is driven, the first driving unit 211 outputs first driving signals $A_{11}$~$A_{1m}$ to the corresponding scan lines $S_{21}$~$S_{2m}$ and the second driving unit 211 outputs the second driving signals $A_{21}$~$A_{2n}$ to the level converting circuit 22. The level converting circuit 22 further receives an output enabling signal $OE_1$ and outputs display signals $A_{31}$~$A_{3n}$ to the data lines $D_{21}$~$D_{2n}$ according to the second driving signals $A_{21}$~$A_{2n}$ and the output enabling signal $OE_1$. In the embodiment, the level converting circuit 22 may be a sample-and-hold circuit or a level shift circuit.

As shown in FIG. 4, the display module 2 further includes a display panel 23 having at least one pixel unit. The alignment of the pixel units may be a one-dimensional matrix or a two-dimensional matrix. In the first embodiment, the display panel 23 includes the pixel units $\mathbf{23}_{11}$~$\mathbf{23}_{mn}$ for example. The alignment of the pixel units $\mathbf{23}_{11}$~$\mathbf{23}_{mn}$ is a two-dimensional matrix. The scan lines $S_{21}$~$S_{2m}$ and the data lines $D_{21}$~$D_{2n}$ are disposed interlacedly on the display panel 23 and form a plurality of interlaced areas. Each of the pixel units $\mathbf{23}_{11}$~$\mathbf{23}_{mn}$ is disposed on the corresponding interlaced areas. To simplify the illustration, the pixel unit $\mathbf{23}_{11}$ is used as an example to illustrate its equivalent circuit.

Figure 5:
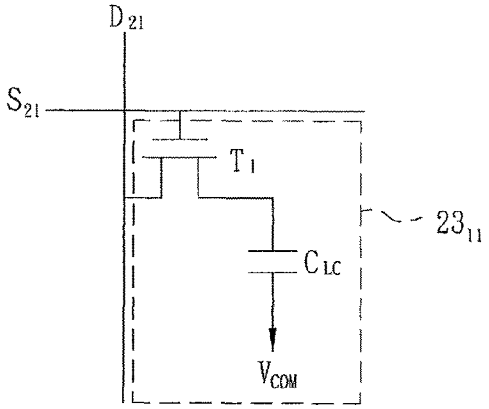
FIG. 5 is a schematic view of a pixel unit according to the first embodiment of the present invention.

FIG. 5 is a schematic view of a pixel unit $\mathbf{23}_{11}$. With reference to FIG. 5, the pixel unit $\mathbf{23}_{11}$ includes a transistor $T_1$ and a pixel capacitor $C_{LC}$. The transistor $T_1$ is electrically connected to the scan line $S_{21}$ and the data line $D_{21}$. One terminal of the pixel capacitor $C_{LC}$ is electrically connected to the transistor $T_1$ and the other terminal thereof is electrically connected to the common voltage $V_{com}$.

Figure 6:
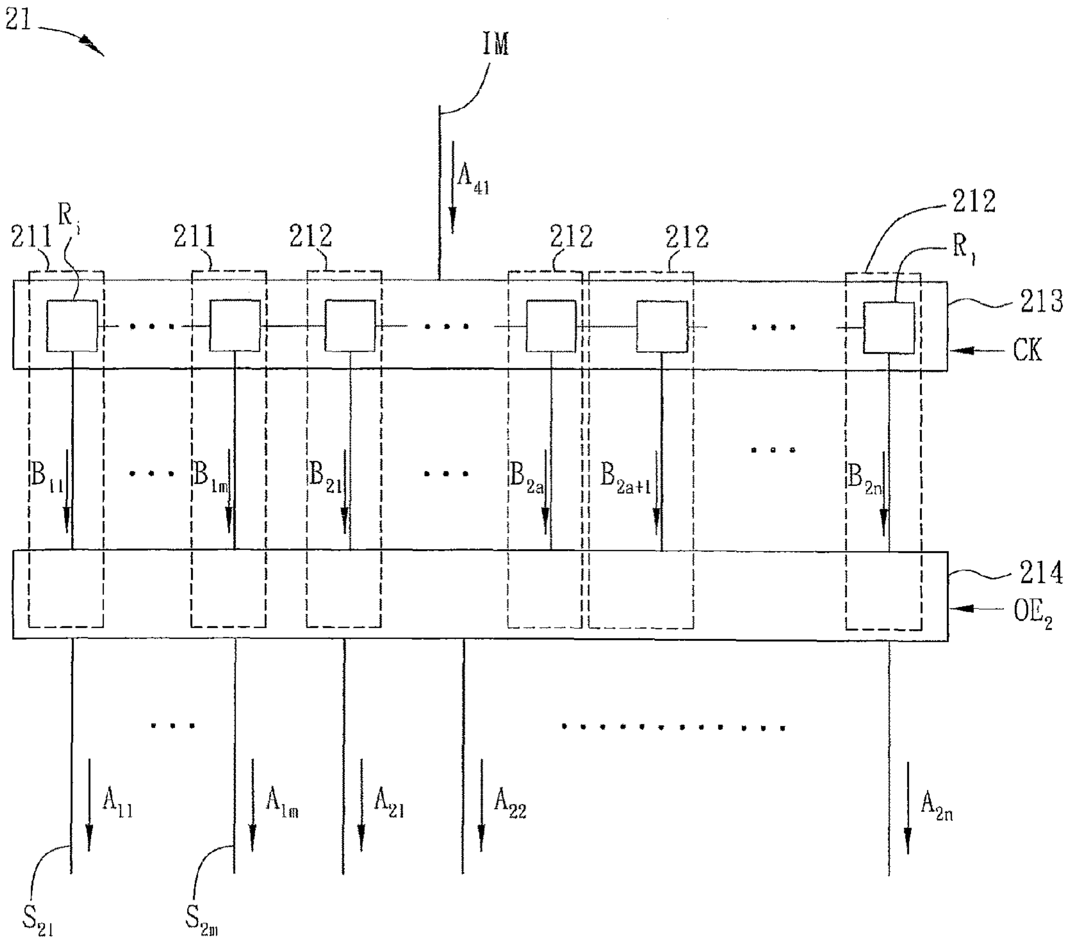
FIG. 6 is a schematic view of a driving circuit according to the first embodiment of the present invention.

FIG. 6 is a schematic view of the driving circuit 21. With reference to FIG. 6, at least one register is included in the first driving unit 211 and the second driving unit 212. The registers $R_1$~$R_i$ in FIG. 6 may form a shift register unit 213 for storing the driving signal and image signal. Other than the shift register unit 213, the driving circuit 21 further includes a level shift unit 214, which is electrically connected to the shift register unit 213 and the level converting circuit 22. A non-DC signal is transmitted between the first driving unit 211 and the second driving unit 212. It may be a driving signal and/or an image signal. The non-DC signal is transmitted to the second driving unit 212 via the first driving unit 211, or the other way around. This is not limited in the embodiment.

The shift register unit 213 receives at least one input signal. In the embodiment, the shift register unit 213 is electrically connected to the signal transmission line IM. The signal transmission line IM receives an input signal $A_{41}$. However, the user may orderly input the driving signal and the image signal to the shift register unit 213 according to the connections in the panel. The method for transmitting and receiving the signal is not limited herein. Moreover, the input signal $A_{41}$ may be generated from the external circuit or the inner part of the display module 2 (e.g. the driving circuit 21), and the method for generating the signals is not limited herein.

Figure 7:
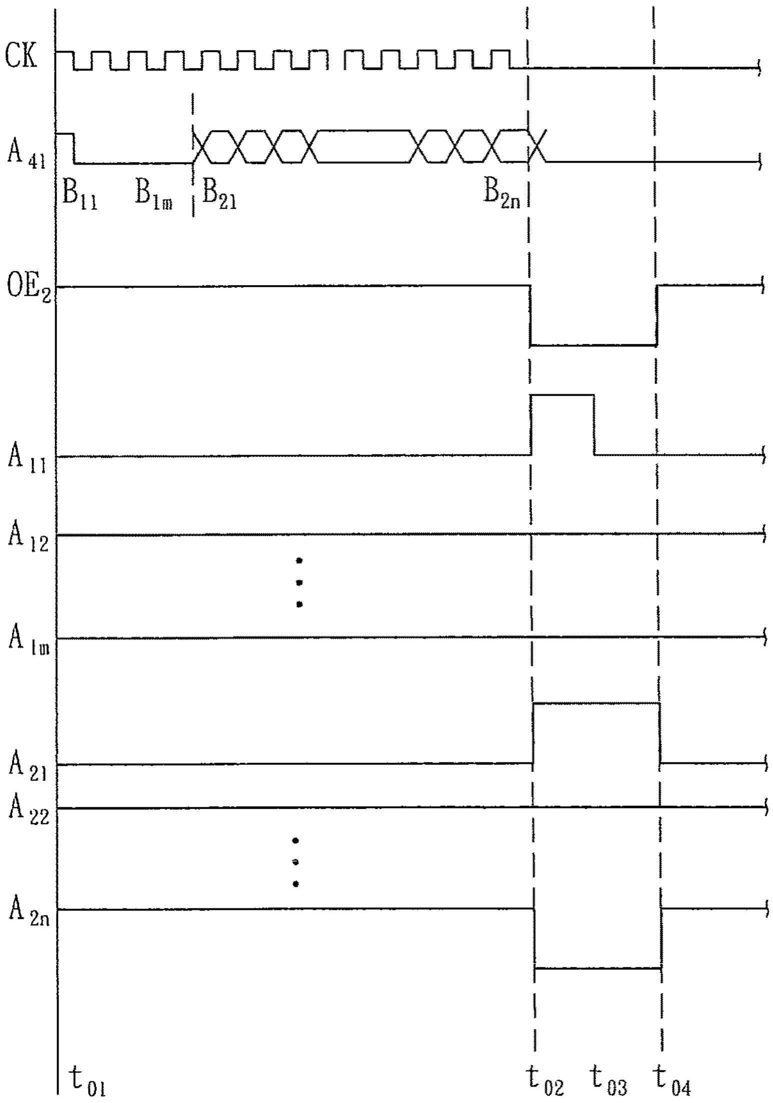
FIG. 7 is a timing control diagram of the driving circuit of the display device according to the first embodiment of the present invention.

FIG. 7 is a timing control diagram of the driving circuit 21. With reference to FIG. 7, the input signal $A_{41}$ includes a plurality of driving data $B_{11}$~$B_{1m}$ and a plurality of image data $B_{21}$~$B_{2n}$.

During time $t_{01}$~$t_{02}$, the shift register unit 213 receives a clock signal CK and the input signal $A_{41}$ according to the clock signal CK. The operation of the shift register unit 213 will be detailed described hereinafter.

The shift register unit 213 starts to receive the input signal $A_{41}$ according to the clock signal CK at time $t_{01}$. After the shift register unit 213 receives the input signal $A_{41}$, the driving data $B_{11}$ is temporarily stored in the register $R_1$ and the driving data $B_{12}$ is temporarily stored in the register $R_2$, and so forth. With the clock signal CK, the driving data $B_{11}$~$B_{1m}$ and the image data $B_{21}$~$B_{2n}$ are stored in the registers $R_1$~$R_i$. Meanwhile, the level shift unit 214 may be turned off by an input enabling signal $OE_2$, and the driving data $B_{11}$~$B_{1m}$ and the image data $B_{21}$~$B_{2n}$ are not outputted to the scan lines $S_{21}$~$S_{2m}$ and the data lines $D_{21}$~$D_{2n}$.

With reference to FIG. 7, during time $t_{02}$~$t_{04}$, the clock signal CK is at a fixed level, for example, a low voltage level. It is for sure that in different embodiments, the clock signal CK may also be at a high voltage level or at a floating state, such that the shift register unit 213 stops the operation of the registers $R_1$~$R_i$. Meanwhile, the shift register unit 213 generates the output driving signal and the output image signal to the level shift unit 214, and adjusts a voltage level of the output driving signal and a voltage level of the output image signal by the level shift unit 214, respectively. That is, the output driving signal includes the driving data $B_{11}$~$B_{1m}$ and the output image signal includes the image data $B_{21}$~$B_{2n}$.

After the level shift unit 214 converts the output driving signal into the first driving signals $A_{11}$~$A_{1m}$ according to the output enabling signal $OE_2$, it outputs the first driving signals $A_{11}$~$A_{1m}$ to the corresponding scan lines $S_{21}$~$S_{2m}$. Then the level shift unit 214 converts the image signal into the second driving signals $A_{21}$~$A_{2n}$, after that it outputs the second driving signals $A_{21}$~$A_{2n}$ to the level converting circuit 22. After the level converting circuit 22 converts the second driving signals $A_{21}$~$A_{2n}$ into the display signals $A_{31}$~$A_{3n}$ according to the output enabling signal $OE_1$, it outputs the display signals $A_{31}$~$A_{3n}$ to the corresponding data lines $D_{21}$~$D_{2n}$. The display signals $A_{31}$~$A_{3n}$ have different levels according to the images that are desired to be shown and this is not limited in the figure.

Figure 8:
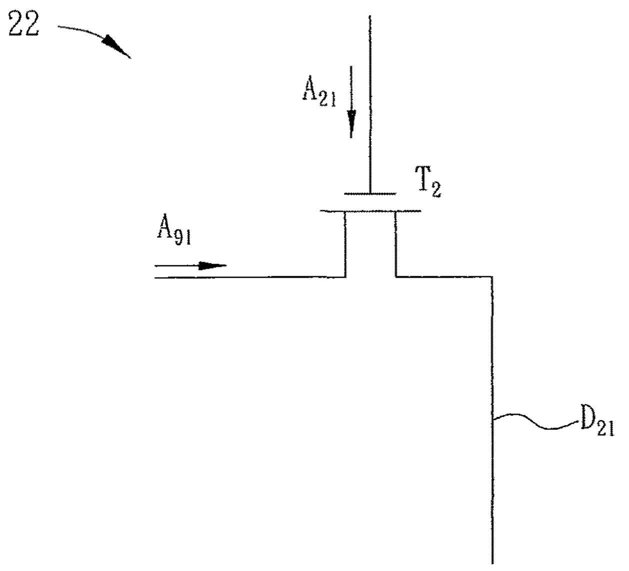
FIGS. 8 to 9 are aspects of a level converting circuit of the display device according to the first embodiment of the present invention.

With reference to FIG. 8, the level converting circuit 22 may be a sample-and-hold circuit, which includes a plurality of transistors. To simplify the illustration, a transistor $T_2$ is used as an example. In the embodiment, the second driving signal $A_{21}$ controls the transistor $T_2$ to be in an on-state or an off-state. When the transistor $T_2$ is in an on-state, a display signal $A_9$ may be transmitted to the data line $D_{21}$ via the transistor $T_2$, where the display signal $A_{81}$ may be a single level signal or a multi-level signal.

Figure 9:
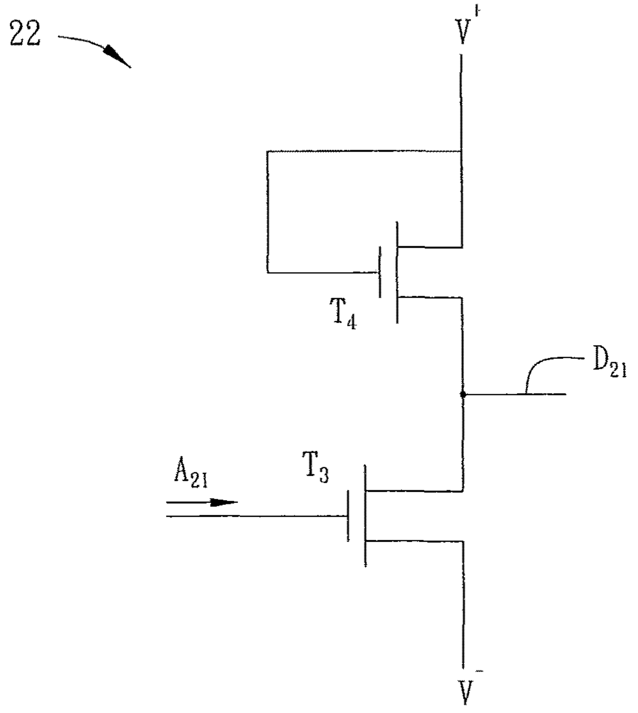

As shown in FIG. 9, the level converting circuit 22 may be an inverting circuit that has an inverting unit. To simplify the illustration, an inverting unit is used as an example. The inverting unit includes a transistor $T_3$ and a transistor $T_4$. In the embodiment, the voltage level of the second driving signal $A_{21}$ is converted into the voltage level $V^+$ or the voltage level $V^-$, and such voltage level is outputted to the data line $D_{21}$.

Additionally, in practice, at least a part of the driving circuit 21 and level converting circuit 22 is disposed on an integrated circuit (IC) chip by single crystal semiconductor manufacturing process, or is disposed on the same substrate with the pixel units $\mathbf{23}_{11}$~$\mathbf{23}_{mn}$ by poly-crystal manufacturing process or amorphous crystal manufacturing process. The amorphous silicon manufacturing process may be an amorphous silicon thin film transistor manufacturing process or an organic thin film transistor manufacturing process. The manufacturing process may also be a combination of manufacturing processes. For example, the driving circuit 21 may be disposed in an IC chip by single crystal semiconductor manufacturing process, and the level converting circuit 22 and the pixel units $\mathbf{23}_{11}$~$\mathbf{23}_{mn}$ are disposed on the same substrate by poly-crystal manufacturing process or amorphous crystal manufacturing process.

Figure 10:
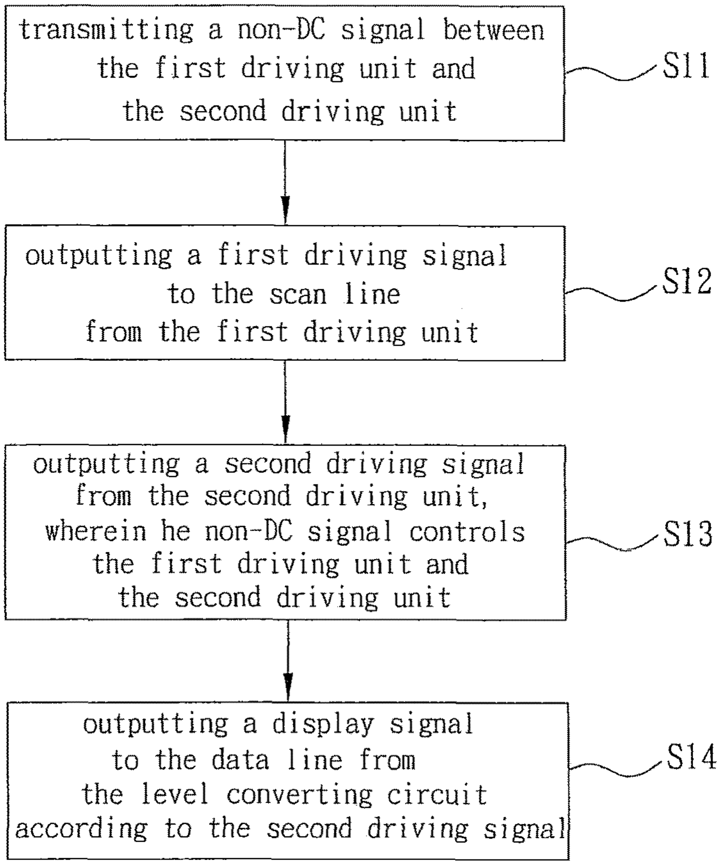
FIG. 10 is flowchart of a control method according to the first embodiment of the present invention.

With reference to FIG. 10, the driving method of the display module according to the first embodiment of the present invention may be applied to the display module 2 in FIG. 4. The control method of the present invention includes steps S11 to S14.

Step S11 is to transmit a non-DC signal between the first driving unit and the second driving unit. Step S12 is to output a first driving signal to the scan line from the first driving unit. Step S13 is to output a second driving signal from the second driving unit. The non-DC signal controls the first driving unit and the second driving unit. Step S14 is to output a display signal to the data line from the level converting circuit according to the second driving signal.

The driving control method is illustrated in the previous embodiment; therefore a detailed description thereof is omitted herein. It is noted that the above-mentioned steps are not limited to this order, which can be adjusted according to the actual needs.

Second Embodiment

Figure 11:
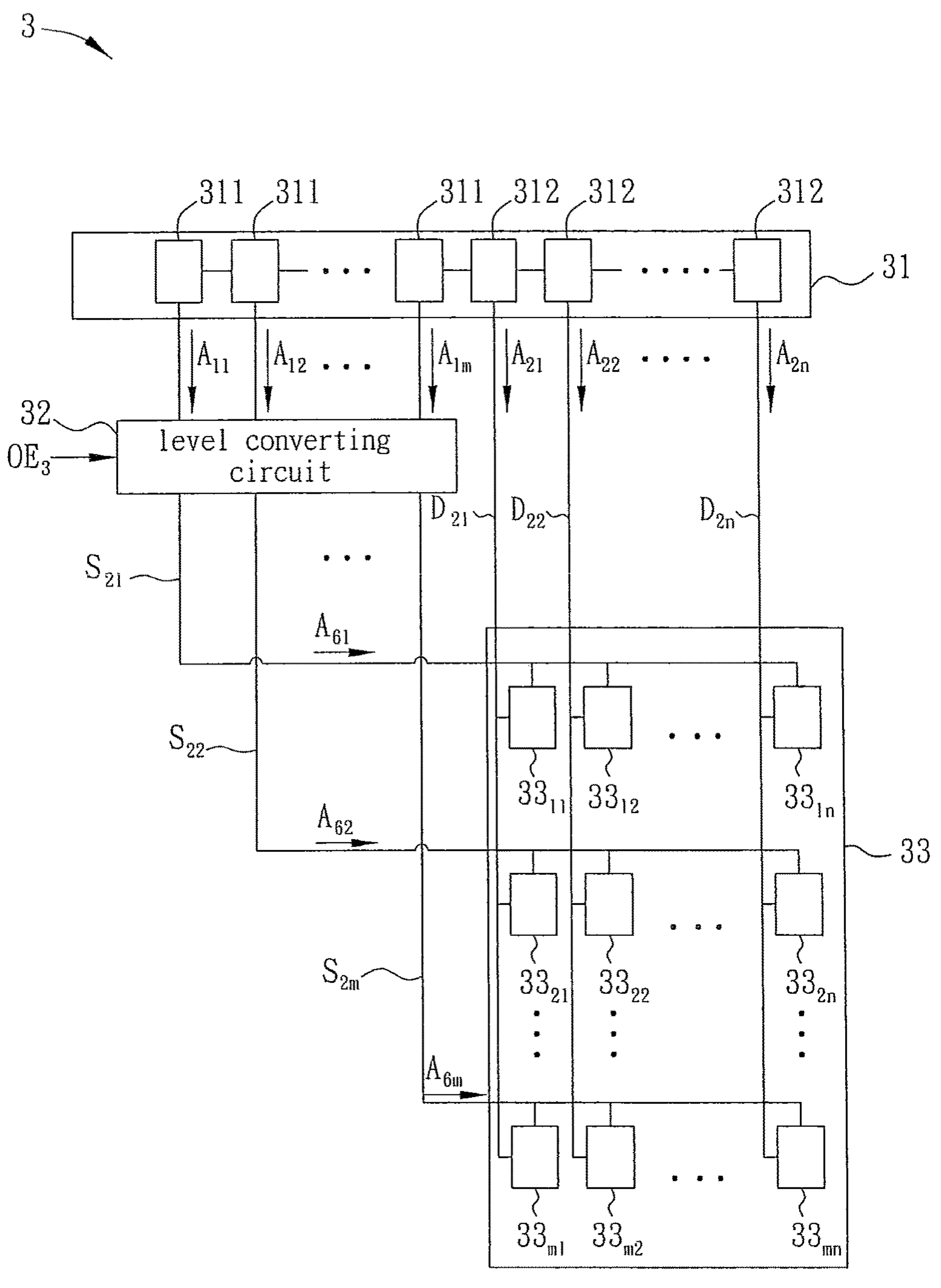
FIG. 11 is a schematic view of a display device according to the second embodiment of the present invention.

FIG. 11 is a schematic view of a display device 3. With reference to FIG. 11, the display module 3 includes a scan line, a data line, a driving circuit 31, and a level converting circuit 32. In the embodiment, the display module 3 includes a plurality of scan lines $S_{21}$~$S_{2m}$ and a plurality of data lines $D_{21}$~$D_{2n}$ for example. The driving circuit 31 is electrically connected to the data lines $D_{21}$~$D_{2n}$ and the level converting circuit 32, respectively. The level converting circuit 32 is electrically connected to the data lines $S_{21}$~$S_{2m}$.

The driving circuit 31 has at least one first driving unit and at least one second driving unit. In the embodiment, the driving circuit 31 includes a plurality of first driving units 311 and a plurality of second driving units 312 for example. The first driving units 311 are electrically connected to the second driving units 312. Each of the first and second driving units 311 and 312 may have the same or different circuit structures, respectively, and it is not limited herein.

As shown in FIG. 11, the display module 3 further includes a display panel 33. In the second embodiment, the display panel 33 includes the pixel units $\mathbf{33}_{11}$~$\mathbf{33}_{mn}$ for example. Additionally, the functions, structures, and operations of the driving circuit 31, level converting circuit 32, first driving unit 311, second driving unit 312, display panel 33, and pixel units $\mathbf{33}_{11}$~$\mathbf{33}_{mn}$ are the same as those of the driving circuit 21, level converting circuit 22, first driving unit 211, second driving unit 212, and pixel units $\mathbf{23}_{11}$~$\mathbf{23}_{mn}$ in FIG. 4. Therefore, a detailed description thereof will be omitted herein.

Additionally, in practice, at least a part of the driving circuit 31 and level converting circuit 32 is disposed in an IC chip by single crystal semiconductor manufacturing process, or is disposed on the same substrate with the pixel units $\mathbf{33}_{11}$~$\mathbf{33}_{mn}$ by poly-crystal manufacturing process or amorphous crystal manufacturing process. The amorphous manufacturing process may be an amorphous silicon thin film transistor manufacturing process or an organic thin film transistor manufacturing process. It may also be the combination of manufacturing processes, for example, the driving circuit 31 is disposed in an IC chip by single crystal semiconductor manufacturing process, and the level converting circuit 32 and the pixel units $\mathbf{33}_{11}$~$\mathbf{33}_{mn}$ are disposed on the same substrate by poly-crystal manufacturing process or amorphous crystal manufacturing process.

When the display module 3 is driven, the first driving unit 311 outputs the first driving signals $A_{11}$~$A_{1m}$ to the level converting circuit 22 and the second driving unit 312 outputs the second driving signals $A_{21}$~$A_{2n}$ to the corresponding data lines $D_{21}$~$D_{2n}$. The level converting circuit 32 further receives an output enabling signal $OE_3$ and outputs scanning signals $A_{61}$~$A_{6m}$ to the scan lines $S_{21}$~$S_{2n}$ according to the first driving signals $A_{11}$~$A_{1m}$ and the output enabling signal $OE_3$.

Figure 12:
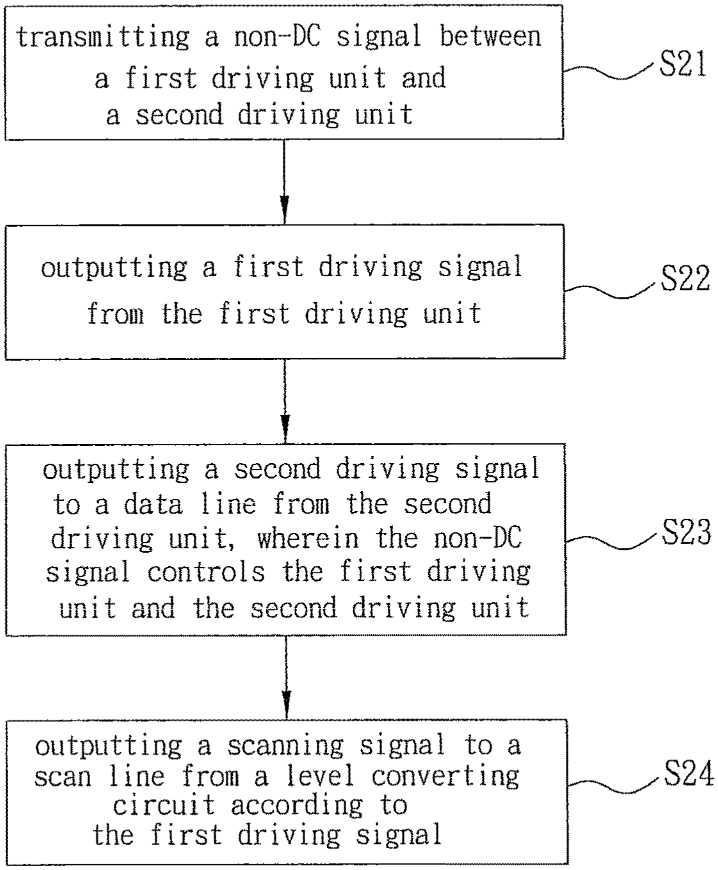
FIG. 12 is a flowchart of a control method according to the second embodiment of the present invention.

With reference to FIG. 12, the driving method of the display module according to the second embodiment of the present invention is applied to the display device 3 in FIG. 11. The control method of the present invention includes the steps S21 to S24.

Step S21 is to transmit a non-DC signal between the first driving unit and the second driving unit. Step S22 is to output a first driving signal from the first driving unit. Step S23 is to output a second driving signal to the data line from the second driving unit. The non-DC signal controls the first driving unit and the second driving unit. Step S24 is to output a scanning signal to the scan line according to the first driving signal.

The control method is illustrated in the previous embodiment; therefore a detailed description thereof is omitted herein. It is noted that the above-mentioned steps are not limited to this; the order of the steps may be adjusted according to actual needs.

Third Embodiment

Figure 13:
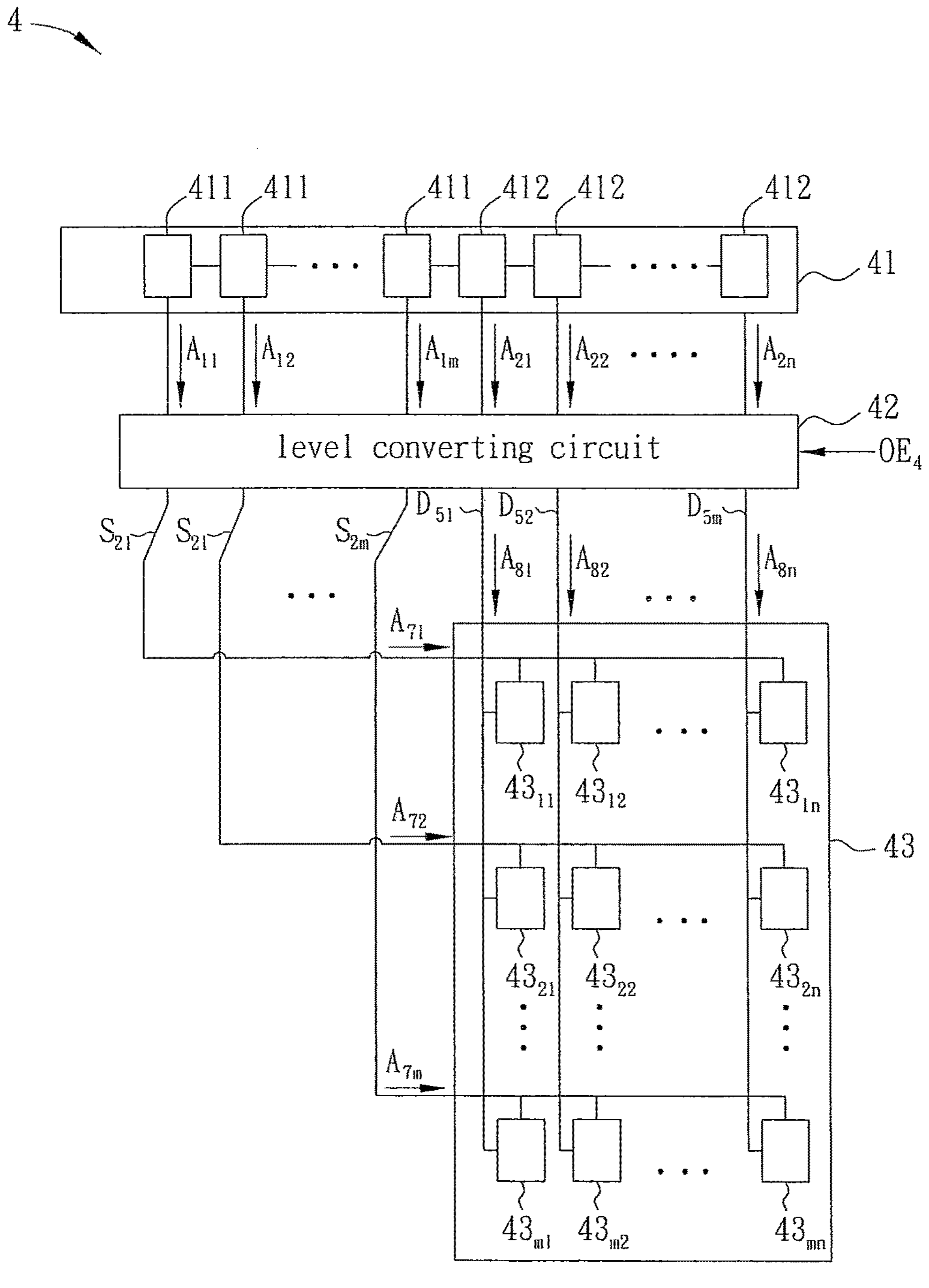
FIG. 13 is a schematic view of a display device according to a third embodiment of the present invention.

FIG. 13 is a schematic view of a display device 4. With reference to FIG. 13, the display module 4 includes a scan line, a data line, a driving circuit 41, and a level converting circuit 42. In the embodiment, the display module 4 includes a plurality of scan lines $S_{21}$~$S_{2m}$ and a plurality of data lines $D_{21}$~$D_{2n}$ for example. The driving circuit 41 is electrically connected to the level converting circuit 42, which is electrically connected to the data lines $D_{21}$~$D_{2n}$ and scan lines $S_{21}$~$S_{2m}$.

The driving circuit 41 includes at least one first driving unit and at least one second driving unit. In the embodiment, the driving circuit 41 has a plurality of first driving units 411 and a plurality of second driving units 412 for example. The first driving unit 411 is electrically connected to the second driving unit 412. Each of the first and second driving units 411 and 412 may have the same or different circuit structures and this is not limited herein.

As shown in FIG. 13, the display module 4 further includes a display panel 43. In the second embodiment, the display panel 43 has pixel units $\mathbf{43}_{11}$~$\mathbf{43}_{mn}$ for example. Additionally, the functions, structures, and operations of the driving circuit 41, level converting circuit 42, first driving unit 411, second driving unit 412, display panel 43, and pixel units $\mathbf{43}_{11}$~$\mathbf{43}_{mn}$ are the same as those of the driving circuit 21, level converting circuit 22, first driving unit 211, second driving unit 212, and pixel units $\mathbf{23}_{11}$~$\mathbf{23}_{mn}$ in FIG. 4.

Additionally, in practice, at least a part of the driving circuit 41 and the level converting circuit 42 is disposed in an IC chip by single crystal semiconductor manufacturing process, or is disposed on the same substrate with the pixel units $\mathbf{43}_{11}$~$\mathbf{43}_{mn}$ by poly-crystal manufacturing process or amorphous crystal manufacturing process. It may also be a combination of manufacturing processes. For example, the driving circuit 41 is disposed in an IC chip by single crystal semiconductor manufacturing process, and the level converting circuit 42 and the pixel units $\mathbf{43}_{11}$-$\mathbf{43}_{mn}$ are disposed on the same substrate by poly-crystal manufacturing process or amorphous crystal manufacturing process.

When the display module 4 is driven, the first driving unit 411 outputs the first driving signals $A_{11}$~$A_{1m}$ to the level converting circuit 42 and the second driving unit 412 outputs the second driving signals $A_{21}$~$A_{2n}$ to the level converting circuit 42, The level converting circuit 42 further receives an output enabling signal $OE_4$, outputs the scanning signals $A_{71}$~$A_{7m}$ to the scan lines $S_{21}$~$S_{mn}$ and outputs the display signals $A_{81}$~$A_{8n}$ to the data lines $D_{21}$~$D_{2m}$ according to the output enabling signal $OE_4$.

Figure 14:
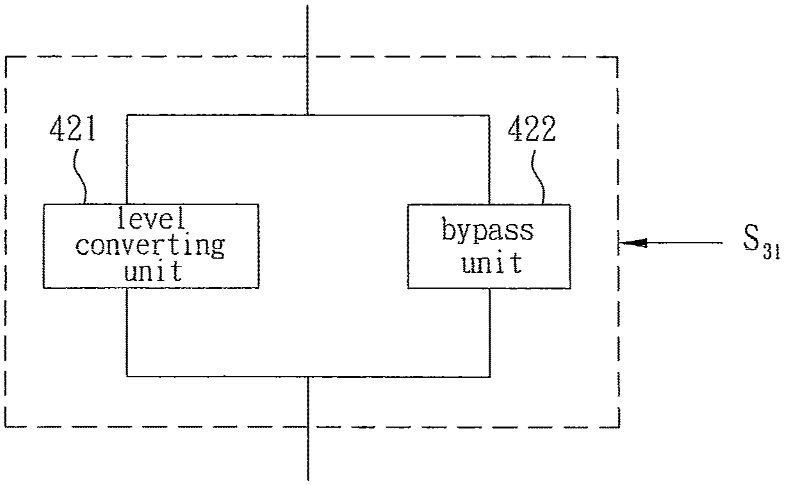
FIG. 14 is a schematic view of a level converting circuit of the display device according to the third embodiment of the present invention.

With reference to FIG. 14, the level shift circuit 42 further includes a plurality of level converting unit and a plurality of bypass units. Each level converting units is electrically connected to the corresponding bypass unit. One terminal of the level converting unit is electrically connected to the first driving unit 411 or the second driving unit 412, and the other is electrically connected to the scan lines $S_{21}$~$S_{2m}$ or the data lines $D_{21}$~$D_{2n}$. To simplify the illustration, a level converting unit 421 and a bypass unit 422 are used as example.

The level converting unit 421 or the bypass unit 422 is selected by the level converting circuit 42 for the first driving signals $A_{11}$~$A_{1m}$ to pass through according to a selecting signal $S_{31}$ for outputting the scanning signals $A_{71}$~$A_{7m}$ to the scan lines $S_{21}$~$S_{2m}$ or outputting the display signals $A_{81}$~$A_{8n}$ to the data lines $D_{21}$~$D_{2n}$. Alternatively, the level converting unit 421 or the bypass unit 422 is selected for the second driving signals $A_{21}$~$A_{2m}$ to pass through according to the selecting signal for outputting the scanning signals $A_{71}$~$A_{7m}$ to the scan lines $S_{21}$~$S_{2m}$ or outputting the display signals $A_{81}$~$A_{8n}$ to the data lines $D_{21}$~$D_{2n}$. In the embodiment, the level converting circuit 42 makes the first driving signals $A_{11}$~$A_{1m}$ pass through the bypass unit 422 and the second driving signals $A_{21}$~$A_{2m}$ pass through the level converting unit 421 according to the selecting signal $S_{31}$.

Figure 15:
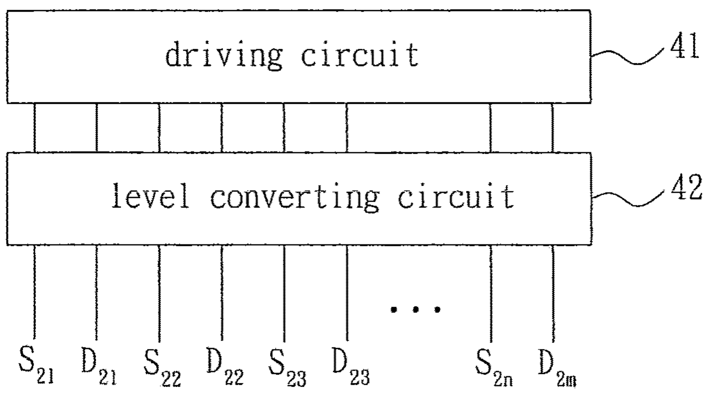
FIGS. 15 and 16 are schematic views of dispositions of scan lines and data lines of a driving circuit according to the third embodiment of the present invention.
Figure 16:
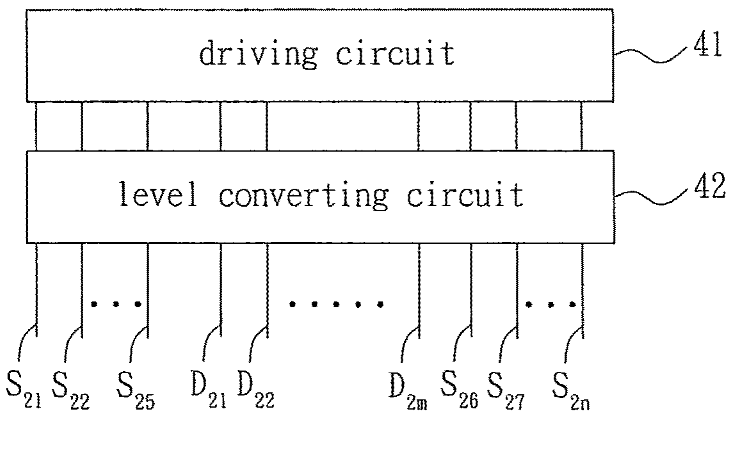

Moreover, the alignment of the scan lines $S_{21}$~$S_{2n}$ and data lines $D_{21}$~$D_{2m}$ of the display module 21 connecting the driving circuit 22 is not limited in the first embodiment. Those skilled in the art may align the scan lines $S_{21}$~$S_{2n}$ and the data lines $D_{21}$~$D_{2m}$ in the form as shown in FIGS. 15 and 16, or in other forms. It is not limited to these.

Figure 17:
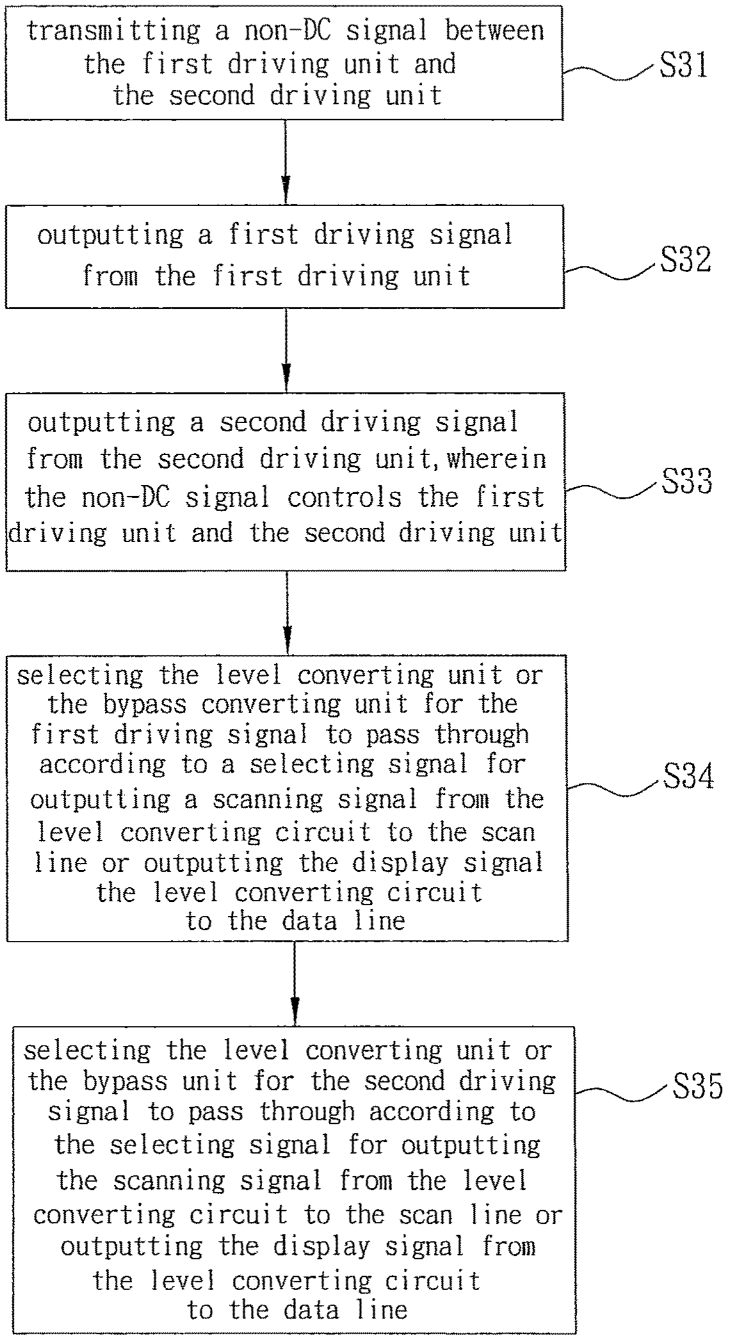
FIG. 17 is a flowchart of the control method according to the second embodiment of the present invention.

FIG. 17 shows the driving method of the display module according to the third embodiment of the present invention. The driving method is applied to the display device 4 in FIG. 13. The control method of the present invention includes steps S31 to S34.

Step S31 is to transmit a non-DC signal between the first driving unit and the second driving unit. Step S32 is to output a first driving signal from the first driving unit. Step S33 is to output a second driving signal from the second driving unit, where the non-DC signal controls the first driving unit and the second driving unit. Step S34 is to select the level converting unit or the bypass unit by the level converting circuit for the first driving signal to pass through according to a selecting signal for outputting a scanning signal to the scan line or outputting the display signal to the data line. Step S35 is to select the level converting unit or the bypass unit by the level converting circuit for the second driving signal to pass through according to the selecting signal for outputting the scanning signal to the scan line or outputting the display signal to the data line.

The control method has been illustrated in the previous embodiment; therefore a detailed description is omitted herein. It is noted that the above-mentioned steps are not limited to this order, which can be adjusted according to the actual needs.

Furthermore, the alignments of the scan lines $S_{21}$~$S_{2n}$ of the display module 2 connecting the driving circuit 22 and the data lines $D_{21}$~$D_{2m}$ of the display module 2 connecting the level converting circuit 22 are not limited in the first embodiment. Those skilled in the art may align the scan lines $S_{21}$~$S_{2n}$ with the data lines $D_{21}$~$D_{2m}$ in the form as shown in FIGS. 16 and 17, or in other forms. It is not limited to these.

To sum up, the present invention discloses the driving circuit, display device, and control method thereof that use the driving circuit having the shift register unit and level shift unit to enable the display module to display images. Compared to prior art, other than integrating the conventionally scan driving circuit and the data driving circuit, the display device of the present invention may further use a driving circuit with a simpler structure and process the scanning signal and display signal simultaneously. Therefore, the driving circuit, display device, and control method thereof in the present invention may decrease the number of elements for saving space, so as to reduce the production cost.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A display module, comprising:
- a scan line;
- a data line;
- a driving circuit having at least one first driving unit electrically connected to at least one second driving unit, wherein a non-DC signal is transmitted to the second driving unit via the first driving unit when a second driving signal is applied and a non-DC signal is transmitted to the first driving unit via the second driving unit when a first driving signal is applied, the first driving unit outputs a scanning signal as the first driving signal to the scan line, and the second driving unit outputs a data signal as the second driving signal; and
- a level converting circuit electrically connected to the driving circuit and the data line, and outputting a display signal to the data line according to the second driving signal.

2. The display module according to claim 1, wherein the first driving unit receives the non-DC signal from the second driving unit, or the second driving unit receives the non-DC signal from the first driving unit.

3. The display module according to claim 1, wherein the level converting circuit adjusts a voltage level of the second driving signal.

4. The display module according to claim 1, wherein the level converting circuit further receives an output enabling signal and outputs the display signal to the data line according to the output enabling signal.

5. The display module according to claim 1, wherein the level converting circuit is a sample-and-hold circuit or a level shift circuit.

6. A driving method of a display module having a scan line, a data line, a driving circuit, and a level converting circuit, wherein the driving circuit has at least one first driving unit electrically connected to at least one second driving unit, the driving method comprising the steps of:
- transmitting a non-DC signal to the second driving unit via the first driving unit when a second driving signal is applied and transmitting a non-DC signal to the first driving unit via the second driving unit when a first driving signal is applied;
- outputting a scanning signal as the first driving signal to the scan line from the first driving unit;
- outputting a data signal as the second driving signal from the second driving unit, wherein the non-DC signal controls the first driving unit and the second driving unit; and
- outputting a display signal to the data line from the level converting circuit according to the second driving signal.

7. The driving method according to claim 6, further comprising a step of:
- adjusting a voltage level of the second driving signal by the level converting circuit.

8. The driving method according to claim 7, further comprising a step of:
- outputting the display signal to the data line from the level converting circuit according to an output enabling signal.

9. A display module, comprising:

a scan line;

a data line;

a driving circuit having at least one first driving unit electrically connected to at least one second driving unit, wherein a non-DC signal is transmitted to the second driving unit via the first driving unit when a second driving signal is applied a non-DC signal is transmitted to the first driving unit via the second driving unit when a first driving signal is applied, the first driving unit outputs a scanning signal as the first driving signal, and the second driving unit outputs a data signal as the second driving signal to the data line; and a level converting circuit electrically connected to the first driving unit and the scan line, and outputting a scanning signal to the scan line according to the first driving signal.

10. The display module according to claim 9, wherein the first driving unit receives the non-DC signal from the second driving unit, or the second driving unit receives the non-DC signal from the first driving unit.

11. The display module according to claim 9, wherein the level converting circuit adjusts a voltage level of the first driving signal.

12. The display module according to claim 9, wherein the level converting circuit further receives an output enabling signal and outputs the scanning signal to the scan line according to the output enabling signal.

13. The display module according to claim 1, wherein the level converting circuit comprises a sample-and-hold circuit or a level shift circuit.

14. A driving method of a display module having a scan line, a data line, a driving circuit, and a level concerting circuit, wherein the driving circuit has at least one first driving unit electrically connected to at least one second driving unit, the driving method comprising the steps of:

transmitting a non-DC signal to the second driving unit via the first driving unit when a second driving signal is applied and transmitting a non-DC signal to the first driving unit via the second driving unit when a second first driving signal is applied;

outputting a scanning signal as the first driving signal to the level converting circuit from the first driving unit;

outputting a data signal as the second driving signal to the data line from the second driving unit, wherein the non-DC signal controls the first driving unit and the second driving unit; and outputting a scanning signal to the scan line from the level converting circuit according to the first driving signal.

15. The driving method according to claim 14, further comprising a step of:

adjusting a voltage level of the first driving signal by the level converting circuit.

16. The driving method further according to claim 14, further comprising a step of:

outputting the scanning signal to the scan line from the level converting circuit according to an output enabling signal.

17. A display module, comprising:

a scan line;

a data line;

a driving circuit having at least one first driving unit electrically connected to at least one second driving unit, wherein a non-DC signal is transmitted to the second driving unit via the first driving unit when a second driving signal is applied a non-DC signal is transmitted to the first driving unit via the second driving unit when a second first driving signal is applied, the first driving unit outputs a scanning signal as the first driving signal and the second driving unit outputs a data signal as the second driving signal; and a level converting circuit having a level converting unit and a bypass unit connected to the level converting circuit in parallel, wherein the level converting circuit is electrically connected to the driving circuit, the scan line, and the data line, and the level converting unit or the bypass unit is selected for the first driving signal to pass through according to a selecting signal for outputting a scanning signal to the scan line or outputting the display signal to the data line, or the level converting unit or the bypass unit is selected for the second driving signal to pass through according to the selecting signal for outputting the scanning signal to the scan line or outputting the display signal to the data line.

18. The display module according to claim 17, wherein the level converting circuit adjusts a voltage level of the first driving signal and a voltage level of the second driving signal, respectively.

19. The display module according to claim 17, wherein the level converting circuit further receives an output enabling signal and outputs the scanning signal to the scan line or outputs the display signal to the data line according to the output enabling signal.

20. The display module according to claim 17, wherein the level converting circuit comprises a sample-and-hold circuit or a level shift circuit.

21. A driving method of a display module having a scan line, a data line, a driving circuit, and a level converting circuit, wherein the driving circuit has at least one first driving unit electrically connected to at least one second driving unit, and the level converting circuit has a level converting unit and a bypass unit connected to the level converting unit in parallel, the driving method comprising the steps of:

transmitting a non-DC signal to the second driving unit via the first driving unit when a second driving signal is applied transmitting a non-DC signal to the first driving unit via the second driving unit when a first driving signal is applied;

outputting a scanning signal as the first driving signal from the first driving unit;

outputting a data signal as the second driving signal from the second driving unit, wherein the non-DC signal controls the first driving unit and the second driving unit;

selecting the level converting unit or the bypass converting unit for the first driving signal to pass through according to a selecting signal for outputting a scanning signal from the level converting circuit to the scan line or outputting the display signal from the level converting circuit to the data line; and selecting the level converting unit or the bypass unit for the second driving signal to pass through according to the selecting signal for outputting the scanning signal from the level converting circuit to the scan line or outputting the display signal from the level converting circuit to the data line.

22. The driving method according to claim 21, further comprising a step of:

adjusting a voltage level of the first driving signal or a voltage level of the second signal by the level converting circuit.

23. The driving method according to claim 21, further comprising a step of:

outputting the scanning signal to the scan line from the level converting circuit according to a first output enabling signal; and outputting the display signal to the data line from the level converting circuit according to a second output enabling signal.

* * * * *